United States Patent Office 3,311,479
Patented Mar. 28, 1967

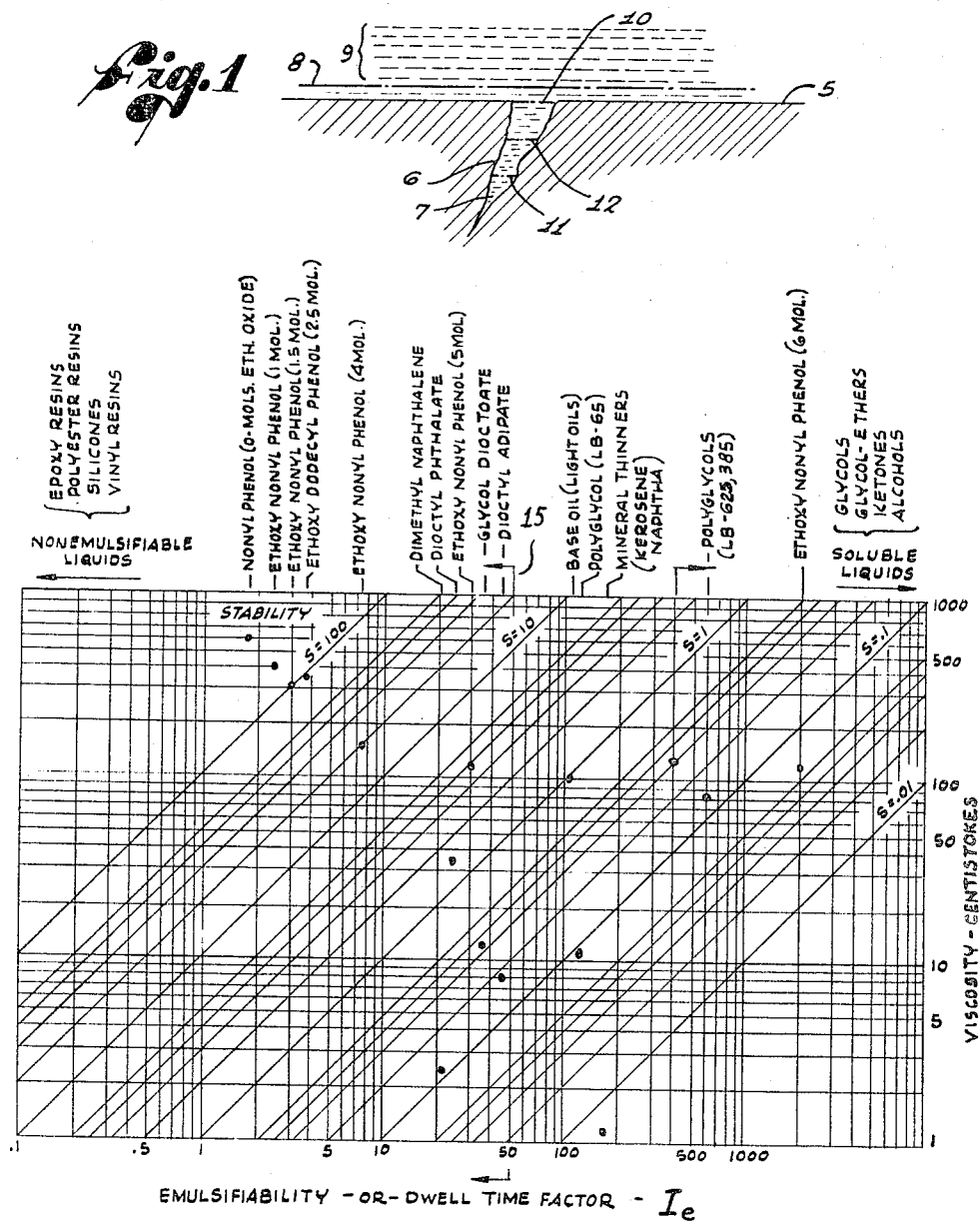

3,311,479
PENETRANT INSPECTION PROCESS AND
COMPOSITIONS
James R. Alburger, 5007 Millard Ave.,
La Canada, Calif. 91011
Filed Oct. 4, 1965, Ser. No. 492,676
21 Claims. (Cl. 106—19)

This invention relates to penetrant inspection methods, and more particularly to improved inspection penetrant flaw tracer compositions and process for use thereof. The present application is a continuation-in-part of my copending application, S.N. 254,487, filed January 28, 1963, for "Penetrant Inspection Process and Compositions," now abandoned.

Penetrant inspection processes are well known in the prior art and comprise nondestructive testing procedures for the purpose of detection in test bodies of extremely small surface discontinuities and sub-surface flaws having surface openings. Such test bodies, or parts, may be constructed of metal, ceramic, or other material. In accordance with the known processes, the parts are usually immersed in a penetrant flaw tracer liquid, which is formulated of a vehicle, or carrier base, having dissolved therein either a fluorescent dye or a nonfluorescent visible color dye. After the parts have been immersed in the penetrant liquid for an appropriate dwell time, said parts are withdrawn from the liquid, and the surface liquid remaining thereon is removed by emulsification and washing. However, minute entrapments of the liquid then remain in any surface discontinuities present in the parts, even though these are extremely small. If a fluorescent dye has been used in the penetrant liquid, such entrapments may be rendered visible by exposure of the parts to ultra-violet radiation. On the other hand, if a non-fluorescent dye has been used in the penetrant liquid, such entrapments can be viewed in ordinary light.

The penetrant inspection processes known in the prior art have presented a number of disadvantages. The penetrant flaw tracer liquids employed have often not yielded sufficiently reliable indications of flaws present in the parts being tested, due to a lack of "stability" of said liquids. By this, it is meant that the tracer entrapments have not had sufficient ability to remain in the vicinity of the flaws. Largely due to such lack of stability, the known penetrant liquids have often failed to exhibit sufficient fluorescent brightness (if a fluorescent dye is employed), or sufficient color contrast (if a nonfluorescent visible dye is employed). The known penetrant liquids have presented a further disadvantage, with respect to the fact that their use has not enabled accurately controlled variations in the formulations used, so as to best suit the requirements of a particular emulsification procedure.

It is, therefore, a primary object of the present invention to provide an improved flaw inspection process.

Another object of the invention is to provide a penetrant inspection process which offers improved reliability of flaw indications.

Still another object of the invention is to provide a penetrant flaw inspection process which offers improved stability of the flaw tracer entrapments.

A further object of the present invention is to provide improved penetrant flaw tracer liquids.

A still further object of the invention is to provide penetrant flaw tracer liquids containing fluorescent dyes which yield improved fluorescent brightness in the flaw indications derived therefrom.

An additional object of the invention is to provide penetrant flaw tracer liquids containing nonfluorescent visible dyes and yielding improved color contrast in the flaw indications derived therefrom.

These and other objects of the invention will become more apparent from the following description thereof when read in conjunction with the accompanying drawings, in which:

FIG. 1 is a diagrammatic representation in cross-section of a surface flaw containing an entrapment of inspection penetrant liquid of the invention along with a layer of applied emulsifier; and FIG. 2 is a chart which illustrates the spectrum of emulsifiability characteristics of various inspection penetrant liquid materials.

In accordance with the present invention, a penetrant inspection process is provided, which process employs a penetrant flaw tracer composition which is normally liquid and is of special constitution. Such penetrant flaw tracer liquid comprises a solvent of the type described below, which solvent serves to provide low water solubility, or emulsifiability, or emulsifier compatability of the penetrant liquid. The solvent employed consists of at least one of the water-insoluble liquid compositions having the formula:

$$\left[ R \right]_{-y}^{-x}$$

in which R is a member selected from the class consisting of bivalent carbocyclic groups, and bivalent aliphatic groups, in which aliphatic groups the valence requirements of each carbon atom are satisfied, and $x$ and $y$ are members selected from the class consisting of alkyl radicals containing from 1–20 carbon atoms, and ethoxy groups containing from 0 to 5 mols of ethylene oxide per mol of R, at least one of the members $x$ and $y$ being an alkyl radical. In the above generic formula, the range of chain lengths for the $x$ and $y$ members may vary depending on the structure of the R nucleus.

The member R may typically be one of the following:

(1) A Napthalene group:

(2) A Phthalate or Isophthalate group:

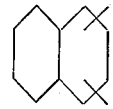

(3) An Alkylene (or Polyalkylene) Glycol group:

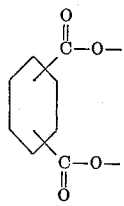

(4) A Saturated Dicarboxylate group:

(5) A Phenolic group:

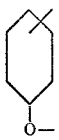

(6) A 4.5 Epoxy-tetrahydrophthalate group; i.e., including the structure:

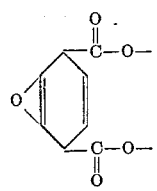

In the case of the formulae of group (3), $n$ is in the approximate range of 0–11 for those compositions of said group which are normally liquid, and similarly in the case of the formulae of group (4), $n$ is in the approximate range of 0–34, for those compositions of said group which are normally liquid.

As already indicated, $x$ and $y$ are selected from the class consisting of alkyl radicals and ethoxy groups. These have the following respective formulae:

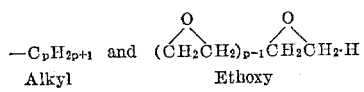

Here, $p$ is in the approximate range of 1–20 for the alkyl chains or 0–20 for the ethoxy chains, for those compositions of said groups which are normally liquid. In cases where the ethoxy content is zero, the ethoxy chain is replaced by a hydrogen atom.

As an example of a solvent having the above generic formula, and in which R is of the type (1); i.e., naphthalene, there may be employed dimethylnaphthalene:

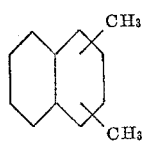

Other and related materials which have been found satisfactory for the purpose of the invention are:

1.4 dimethyl naphthalene
2.3 dimethyl naphthalene
2.4 dimethyl naphthalene
1.4 diethyl naphthalene
2.4 diethyl naphthalene
1.4 dipropyl naphthalene
2.4 dipropyl naphthalene The product of commerce in which the above naphthalenes may be found ordinarily will contain a mixture of the latter. It will be understood, therefore, that for this class of compounds, each of $x$ and $y$ is an alkyl radical containing from 1 to 3 carbon atoms.

As an example of a solvent in which R is of the type (2); i.e., phthalate or isophthalate, there may be employed di-octyl phthalate [(di-2-ethylhexyl) phthalate]

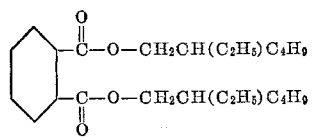

Other and related materials which have been found satisfactory for the purpose of the invention are:

Di(2-ethylhexyl) phthalate (or isophthalate)
Ethylhexyl decyl phthalate (or isophthalate)
Didecyl phthalate It will be understood, therefore, that for this class of compounds, each of $x$ and $y$ is an alkyl radical containing from 6 to 10 carbon atoms.

If R of the solvent is of the type (3), or alkylene glycol, there may be used, for example, triethylene glycol di(2-ethylbutyrate):

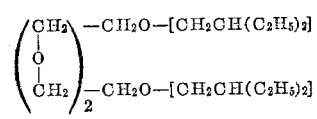

Other and related materials which have been found satisfactory for the purpose of the invention are:

Triethylene glycol di(2-ethylhexoate)
Polyethylene glycol di(2-ethylhexoate),
  M.W.=420 (average)
Ethylene glycol di(2-ethylbutyrate)
Polyethylene glycol di(2-ethylbutyrate),
  M.W.=770 (average)
Propylene glycol di(2-ethylbutyrate)
Polypropylene glycol di(2-ethylhexoate),
  M.W.=2275 (average)

It will be understood, therefore, that for this class of compounds, each of $x$ and $y$ is an alkyl radical containing from 6 to 8 carbon atoms.

If R is of the type (4), or saturated dicarboxylate, there may be employed, for example, didecyl adipate:

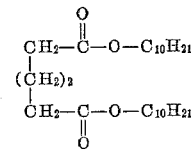

Other and related materials which have been found satisfactory for the purpose of the invention are:

Di(2-ethylbutyl) sebacate
Didecyl oxalate
Di(2-ethylhexyl) adipate
Di(2-ethylamyl) undecane-dicarboxylate
Di(2-ethylheptyl) glutarate
Dinonyl malonate
Didecyl sebacate It will be understood, therefore, that for this class of compounds, each of $x$ and $y$ is an alkyl radical containing from 6 to 10 carbon atoms.

If R is of the type (5), or phenol, there may be employed, for example, dinonyl phenol:

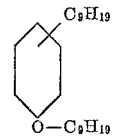

Other and related materials which have been found satisfactory for the purpose of the invention are:

Di(2-ethylhexyl) phenol
Didecyl phenol
Di(undecyl) phenol
Di(dodecyl) phenol

It will be understood, therefore, that for this class of compounds, each of $x$ and $y$ is an alkyl radical containing from 6 to 12 carbon atoms.

Also, if R is of the type (5), or phenol, there may be employed, for example, polyoxyethylene nonylphenol:

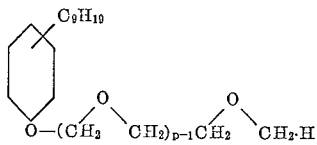

Other and related materials which have been found satisfactory for the purpose of the invention are:

Octylphenol
Nonoylphenol
Decylphenol
Undecylphenol
Dodecylphenol
Ethoxylated octylphenol (polyoxyethylated octylphenol)
Ethoxylated decylphenol
Ethoxylated undecylphenol
Ethoxylated dodecylphenol The above compounds preferably have an ethylene oxide mol ratio ($p$) of from zero to 5. The minimum emulsifiability is obtained when $p$ is zero, and as $p$ is increased, the emulsifiability also increases. It will be seen that when $p$ is zero, only the hydrogen atom is left remaining on this end of the phenol nucleus, and the product is then a simple alkylphenol, for example, nonylphenol.

It will be understood, therefore, that for this class of compounds, $x$ is an alkyl radical containing from 8 to 12 carbon atoms, and $y$ is an ethoxy group containing from zero to 5 mols of ethylene oxide per mol of R.

If R is of the type (6), or 4.5-epoxy-tetrahydrophthalate, there may be employed, for example, di(2-ethylhexyl)-4,5-epoxy-tetrahydrophthalate:

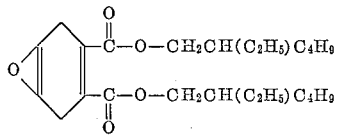

Other and related materials which have been found satisfactory for the purpose of the invention are:

Di(2-ethyl-butyl)4.5-epoxy-tetrahydrophthalate
Di(2-ethyl-amyl)4.5-epoxy-tetrahydrophthalate It will be understood, therefore, that for this class of compounds, each of $x$ and $y$ is an alkyl radical containing from 6 to 8 carbon atoms.

One, or a combination of solvents of the above-specified class, is employed in the formulation of penetrant flaw tracer liquids, for use in the penetrant inspection process of the invention. These solvents are utilized either alone or in combination with other solvents adapted for the dissolution of the fluorescent or nonfluorescent dyes employed in penetrant inspection processes. Such other solvents may, for example, be any of a number of the glycols, including ethylene, diethylene, and triethylene glycol. Many of the glycol ethers are also suitable (e.g., ethylene glycol monobutyl ether, and ethylene glycol monoethyl ether). Also suitable are the vinyl and methyl pyrrolidones. In addition, there may be employed certain of the alcohols (e.g., isopropanol and butanol), or of the ketones (e.g., methylethyl ketone, diacetone alcohol and isophorone). Mineral solvents (e.g., mineral oil and mineral thinner fractions), or diesel fuel are other examples of suitable solvents which may be employed.

As indicated above, the carrier base of a penetrant flaw tracer liquid in accordance with the invention has dissolved therein a dye of the fluorescent sensitizer type, or of the nonfluorescent type. A coupling agent for aiding the solution of the dye may also often be included. The glycol ethers or the alcohols, such as set forth above, have been found to be particularly effective as coupling agents.

A penetrant flaw tracer liquid in accordance with the invention may also contain a "color-former." The latter is a fluorescent material which contributes color to or shifts the fluorescent color of the tracer liquid, to a color other than that of the sensitizer used. Conventional color-former dyes, such as have been known in the art may be employed, for the purpose of the present invention. These are selected for use in conventional manner. The criteria of selection are primarily the solubility of the dye in the particular solvent being employed, the color of the dye, and the dye's brightness.

I have discovered that the presence in a penetrant flaw tracer liquid of a solvent of the specified class of the invention serves to assure a comparatively low effective water solubility, or emulsifiability of the penetrant liquid. The latter, as a result, exhibits improved flaw tracer entrapment stability, and at the same time permits an accurate degree of control over the solubility of the tracer composition in the cleaning phase of the penetrant process.

The important significance of the liquid materials of the invention in providing improved flaw entrapment efficiencies may be better understood by referring now to FIG. 1.

A surface 5 contains a surface flaw 6 in the form of a crack in which there is an entrapment of inspection penetrant material 7, consisting of a dyed liquid. The entrapment 7 is present in the flaw 6 as the result of the application to the surface 5 of a dyed penetrant liquid. A thin film of penetrant 8 is present on the surface 5 as a result of the penetrant application.

When a layer of emulsifier 9 is applied over the surface 5 in order to emulsify and permit wash-removal of the residual penetrant layer 8, the emulsifier layer 9 tends to diffuse down into the entrapment 7 to form a so-called diffusion zone indicated by lines 10 and 11. At the outer extremity of this diffusion zone, at line 10, there is no penetrant present (i.e., zero percent penetrant in the penetrant-emulsifier mixture), while at the inner extremity of the diffusion zone, at line 11, there is no emulsifier present (i.e., 100% penetrant in the penetrant-emulsifier mixture). At some point between the two extremes 10 and 11, there will be a point, indicated by line 12, at which there is a transition in the washability or emulsifiability of the penetrant-emulsifier mixture. Portions of the diffusion zone between lines 10 and 12 will be wash-removable, while portions of the diffusion zone between lines 11 and 12 will be stable against washing and will not be wash-removable.

It will be understood that the position of the transition condition, or washability-break, as illustrated by line 12, will determine the flaw entrapment efficiency of the inspection penetrant liquid. If line 12 is positioned comparatively deep within the flaw 6 (i.e., close down toward line 11), such that the washability transition occurs at a condition of high penetrant concentration in the emulsifier, then the flaw entrapment efficiency will be low. On the other hand, if the transition point occurs comparatively close to the surface 5 (i.e., well out toward line 10), where the concentration of penetrant in the emulsifier is small, then a relatively large part of the entrapment will remain nonwashable and the flaw entrapment efficiency will be relatively high.

It is seen, therefore, that the flaw entrapment efficiency of an inspection penetrant may be maximized by selecting liquid vehicle materials for the dyed penetrant which are characterized by low emulsifiability, such that the entrapments of penetrant tend to resist emulsification. The feature of low emulsifiability may also be expressed as a feature of low penetrant contamination tolerance in the emulsifier, such that relatively small amounts of penetrant added to the emulsifier will act to destroy its washability.

A comparatievly low effective water solubility, or emulsifiability of the penetrant liquid may be achieved through the use of a solvent of the specified class in a concentration as low as about 2% by weight of the penetrant liquid. On the other hand, said solvent may be employed in a concentration as high as about 98% by weight of said penetrant liquid, the balance of the material being made up of inert ingredients, indicator dyes, or other solvent materials.

As an indication of the comparatively low emulsifiability provided by the solvents of the specified class of the invention, a comparison as to emulsifiability may be made between penetrant liquids containing said solvents, and other conventional penetrant liquids. Such emulsifiability may be ascertained by a test for determining the concentration of each penetrant which is required to destroy the water washability of a given standard emuslfier.

To illustrate, the washability of a conventional emulsifier (e.g., consisting of a mixture of sodium petroleum sulfonate, base oil, glycol ethers, and suitable detergents), may be tested in the following manner: Firstly, a drop of the emulsifier is applied to a clean metal surface. The surface is then washed with water, and the drop of emulsifier will dissolve completely, leaving the surface clean. However, when a water-insoluble liquid (e.g., such as a solvent of the specified class of the invention) is added in gradual increments to the emulsifier, a concentration will be reached, at a particular increment of addition, at which a drop of the mixture of emulsifier and water-insoluble liquid, when tested in the above manner, will no longer wash clean from the metal surface, but will leave a film of residue. Such residue can be detected by close visual examination, or by inspection under black light, if a fluorescent tracer is present in the water-insoluble liquid fraction. In other words, the water-insoluble liquid, when present in sufficient concentration in the emulsifier, destroys the water washability of the latter.

For example, ordinary mineral oil, when tested in the above-described manner, and employing the emulsifier of the above-described type, must in some cases be present in the emulsifier in the proportion of 50% or more by volume, of the final mixture, before washability of the mixture is destroyed. On the other hand, some of the solvents of the specified class will, under similar test conditions, destroy the emulsifier washability at a concentration of only a few percent, and all will destroy the emulsifier washability at concentrations on the order of 33% or less, which corresponds to the addition of less than 50% (added) solvent in the emulsifier. As will be understood, the comparative ability of the water-insoluble liquid to destroy the washability of the emulsifier may be considered to be a measure of the emulsifiability of the water-insoluble liquid itself.

Penetrant liquids which are employed in the flaw tracer processes may be evaluated with respect to their tendency to destroy emulsifier washability (and therefore with respect to their own emulsifiability), by means of a standard test, which I have have developed, based upon the above-described procedure. In accordance with this test, an emulsification coefficient ($I_e$) may be determined for each liquid, which coefficient is equivalent to the percentage of added liquid required to destroy emulsifier washability under standard test conditions. In accordance with the test, an emulsifier having the following formulation is utilized:

|  | Parts |
|---|---|
| Iso-octylphenyl ether of polyethylene glycol (water soluble surfactant) | 24 |
| Ethylene glycol monobutyl ether | 24 |
| Sodium petroleum sulfonate | 100 |
| Base oil—100 pale | 500 |
| Indicator dye | as required. |

The above is the emulsifier known as "Tracer-Tech E-153" (trademark) of Shannon Luminous Materials Co., as standardized by the U.S. Air Force.

In conducting the test, a known test portion of the above emulsifier (e.g., 20 cc.) is employed, and the particular solvent liquid being tested is added to the emulsifier in small increments (e.g., from 0.5 to 1 cc.). After each increment of solvent is added to the emulsifier and mixed therewith, a drop of the resultant mixture is selected for test purposes. The drop of the emulsifier-solvent test mixture is placed on a clean aluminum panel surface, and the latter is then washed with water in conventional manner, and until washing is complete, as determined under black light (if the emulsifier or solvent contains a fluorescent indicator dye), or by visual inspection. It will be discovered that drops of the emulsifier-solvent test mixture, containing gradually increased increments of solvent, respectively, will, up to a particular percentage concentration of solvent, wash clean from the surface of the aluminum panel. However, when such particular concentration of added solvent has been exceeded, the emulsifier will be only partly washed away from the panel surface. It may thus be roughly determined at which increment (e.g., 10% added solvent) the washability of the emulsifier will be destroyed. When such determination has been made, finer determinations for the particular solvents may then be made in the same manner as described.

Referring once again to FIG. 1, it will be seen that the smaller the percentage point at which the washability transition (or washability break) occurs, the higher will be the flaw entrapment efficiency, and the greater will be the amount of penetrant liquid retained in the flaw throughout the washing step to provide an indication during the inspection step. Hence, the flaw entrapment efficiency may be expressed mathematically by the relationship:

$$E = \frac{100 - I_e}{100}$$

where the thus stated efficiency values are fractional figures falling between zero and 1. This relationship is accurate over a range of $I_e$ values from zero to about 50% to 75%.

$I_e$ values are expressed in terms of percent of added penetrant or solvent rather than contained penetrant because it is more convenient to measure the amount of material which is added to a test sample that it is to calculate contained penetrant in a mixture. Also, the evaluation of flaw entrapment efficiency factors for the liquid solvent materials of this invention, all of which lie above .5, provides adequate accuracy through use of the above-described method of $I_e$ measurement.

It has been found that ordinary oils which yield $I_e$ values on the order of 100% or more yield flaw entrapment efficiencies of only a few percent. Such materials may be satisfactory for use as inspection penetrants where the flaw geometry and depth are such that large reservoirs of nonemulsified penetrant entrapments remain deep within the flaws. However, where the surface flaws are comparatively shallow and the penetrant-emulsifier diffusion zones extend substantially to the bottom of the flaws, then such penetrant liquids would be stripped out of the flaws completely leaving little or no residual entrapment to provide flaw indications.

The relatively great ability of the solvents of the specified class of the invention to destroy emulsifier washability contributes to the obtaining of improved flaw tracer entrapment stability. In effect, the penetrant flaw tracer liquids obtained in accordance with the invention are, as compared to conventional penetrant liquids, less easily emulsified, and less easily stripped from the flaws during the emulsification and washing steps in the penetrant process.

Referring now to FIG. 2, a chart is here shown which is useful in the comparative evaluation of inspection penetrant efficiency factors and also of so-called entrapment stability factors. In this chart, the abcissa is a scale of emulsifiability characteristics, being set forth in terms of the $I_e$ values as described above. The locations of various liquids with respect to this scale of $I_e$ values are indicated at the top of the chart. The scale of ordinates of the chart is shown in terms of viscosity values in centistokes. The diagonal lines of the chart represent a scale of stability values which is derived from the scales of $I_e$ and viscosity values.

In accordance with the above-described relationship, the flaw entrapment efficiency of an inspection penetrant is a function of its emulsifiability. It will be seen, therefore, that liquid materials having $I_e$ values of 50 or less, falling to the left of the vertical line 15 on the chart, will have flaw entrapment efficiencies greater than .5. The $I_e$ values and viscosities for various of the solvent liquids of the invention are indicated on the chart. Also indicated on the chart are the $I_e$ values for various of the prior art penetrant vehicle liquids. It can be seen that characteristics of the solvent liquids of the invention in respect of their improved levels of flaw entrapment efficiency are distinctly different from prior art materials.

The chart of FIG. 2 also provides a measure of penetrant entrapment stability performance. It will be understood that the above-described diffusion zone in a surface flaw entrapment of inspection penetrant is generated over a period of time during the application of emulsifier to the part being tested. The rate at which this zone forms is a function of the viscosity of the penetrant and emulsifier liquids, so that for a given dwell time or contact time of emulsifier applied onto a test surface, the stability of the flaw entrapment depends in part on the viscosity of the penetrant liquid, such that a stability rating may be applied to a given penetrant liquid which may be expressed by the relationship:

$$S = \frac{\text{Viscosity}}{I_e}$$

These and related factors, and methods for adjusting and controlling penetrant and emulsifier performance, are described in detail in my copending application Ser. No. 464,360, filed June 16, 1965.

For the purpose of this invention, the solvent liquids of the invention provide ($I_e$) values smaller than 50% and flaw entrapment efficiencies greater than .5. In addition, by use of varying proportions of the solvents of the invention, in combination with each other or with ordinary oils, couplers, and other liquids, it is possible to accurately adjust the ($I_e$) value of the resulting mixture to any desired value. Such accurate adjustment is desirable and necessary where, for example, it is required that an inspection penetrant shall permit a minimum contamination tolerance in an emulsifier, such as 25%, while the maximum flaw entrapment efficiency is to be retained. In this case, the ($I_e$) value could be accurately adjusted to 25%, providing an emulsifier contamination tolerance of 25%, and the flaw entrapment efficiency is accurately set at .75.

*Example No. 1.*—The emulsification coefficient ($I_e$) was determined for a conventional penetrant, which consisted of the following:

| | Parts |
|---|---|
| Diethylene glycol monobutyl ether | 18 |
| Fluorescent dye | 2 |
| Base oil—100 pale | 64 |

The standard emulsifier, "Tracer-Tech E-153," the composition of which is set forth above, was employed for the determination of the $I_e$ value.

Twenty ml. of the emulsifier were placed in a small beaker, and the penetrant liquid was then added to the emulsifier in increments of 1 ml. each, and up to a total of 20 ml. Each addition of penetrant liquid was thoroughly mixed into the emulsifier in conventional manner, and a drop of the resulting mixture was then placed on the surface of a clean, anodized aluminum panel, the panel was washed in a gentle stream of running water, and then inspected under black light for the presence of any unremoved residue. It was noticed that all test drops were washed clean, showing that the $I_e$ value of the penetrant liquid was greater than 100%. The $I_e$ value was then adjusted to a desired value of 45% in the following manner:

Twelve parts of polyethylene glycol di(2-ethylhexoate) were added to the penetrant liquid, and the standard $I_e$ test was again employed. This time, examinations of the washed aluminum panel revealed that all test drops were washed clean up to the point of addition of 10 ml. of the penetrant liquid to the standard emulsifier. At this point, and following all subsequent additions of penetrant liquid, an unremoved residue was observed on the aluminum panel. This indicated that the $I_e$ value of the penetrant liquid was about 50%.

A third $I_e$ test was then conducted, in which a total of 20 parts of polyethylene glycol di(2-ethylhexoate) were added to the penetrant liquid. This test, conducted in the same manner as described above, revealed that all of the test drops washed clean from the aluminum panel up to the point of addition of 8 ml. of the pentrant liquid, to the standard emulsifier. At this point, and following all subsequent additions of penetrant liquid, an unremoved residue was observed. This indicated that the $I_e$ value of the test penetrant liquid was about 40%.

On the basis of these tests, it was assumed that the addition of polyethylene glycol di(2-ethylhexoate) to the penetrant liquid in the amount of 16 parts would result in the desired $I_e$ value of about 45%. A final test on a mixture containing such an addition confirmed this fact. Consequently, the correct penetrant formulation designed to yield an $I_e$ value of about 45% was determined to be the following:

| | Parts |
|---|---|
| Diethylene glycol monobutyl ether | 18 |
| Fluorescent dye | 2 |
| Base oil—100 pale | 64 |
| Polyethylene glycol di(2-ethylhexoate) | 16 |

As indicated previously, the above type of test may be employed to determine for each penetrant liquid, an emulsification coefficient ($I_e$), which coefficient is equal to the percentage of added liquid required to destroy the washability of the standard emulsifier. It will be understood that all of the materials of the invention are characterized by relatively low emulsifiability or ($I_e$) values.

As indicated above, the solvents of the specified class have ($I_e$) values which are no higher than about 50%, and may be as low as 1.75% or less. In contrast, ordinary oils, or water-insoluble solvents, have been found to have ($I_e$) values well above 100% for the most part, and in very few cases within the range of 50% to 100%. I have discovered that, for best performance results, the $I_e$ value of a penetrant flaw tracer liquid should be below about 50%. The use of the solvents of the invention enables the formulation of penetrant flaw tracer liquids having such low $I_e$ values.

The solvent liquids of the specified class of the invention are superior solvents for various dyestuffs adapted for use in penetrant inspection processes. Such dyestuffs may, as has previously been indicated, take the form of fluorescent sensitizers, or of visible dyes. If a fluorescent sensitizer is employed, a "color-former" may be utilized in conjunction therewith. Any suitable dye or mixture of dyes may be employed. However, a number of fluorescent sensitizer dyes which have been disclosed as being particularly useful in fluorescent tracer compositions in my copending application, Ser. No. 323,529, filed November 13, 1963, for "Fluorescent Tracers," are, for example, particularly suitable for use in the present instance.

The penetrant inspection process of the invention provides for the use of the penetrant flaw tracer liquids above-described, in the testing of test bodies, parts, etc., which may be constructed of metal, ceramic, or other material, and for the purpose of detecting extremely small surface discontinuities and flaws therein. In accordance with the process in its preferred form, the part to be tested, or a test surface thereof, is first cleaned and degreased in conventional manner, such as by using a vapor degreaser, or by washing with alcohol. One of the penetrant flaw tracer liquids is then applied either by dipping, brushing, or spraying on the test surface. Any suitable shape and size of test surface may be employed. The penetrant is allowed to dwell on the part, or the test surface, for about 5–10 minutes, during which time it penetrates into any micro-cracks or pores in the surface. Excess penetrant is then allowed to drain off from the test surface.

At the completion of the dwell time of the penetrant application, the test surface is treated, in the case of the use of a post-emulsifiable penetrant, with a suitable emulsifier. Such emulsifier may, for example, be of the type specified in U.S. Air Force Military Specification MIL-I-25135 C(ASG). The emulsifier may be applied either by dipping, brush, or spray. If the penetrant liquid used contains a fluorescent dye, the emulsification step may be carried out under continuous black light inspection, such that examination of the test surface will show that the emulsifier has been liberally applied over the entire area thereof. The emulsifier may be allowed to dwell on the test surface for about 2–5 minutes, during which time it mixes with the penetrant on the surface, and renders said penetrant soluble in water.

The test surface is then washed by flushing thoroughly with water. This washing step may be carried out by dipping, or a pressure spray may be employed. Again, the washing step may be carried out under continuous black light inspection to insure that all surface smears of penetrant have been removed. Any residual smears may be cleaned by a local application of emulsifier and re-washing. Any excess water is then allowed to drain off the test surface.

The test area may then be immediately inspected, although in many usages a conventional developer step may be employed, applying a thin film of developer powder particles onto the surface. Flaws are seen by the exudations of visible color or fluorescent penetrant entrapments. As has been explained in my U.S. Patent No. 3,107,298, issued October 15, 1963, for "Apparatus for the Measurement of Fluorescent Tracer Sensitivity," all inspection penetrants exhibit film thickness thresholds below which fluorescence or color cannot be seen. Hence, any reduction in the amount of penetrant material which is retained in a surface flaw, as would result from a low flaw entrapment efficiency of the penetrant liquid vehicle, would cause a reduction in the flaw detection capability of the penetrant. It is, therefore, very important that high levels of flaw entrapment efficiency be utilized for applications where extremely small flaws are to be detected.

*Example No. 2.*—A molybdenum disilicide-coated space vehicle skin component was first cleaned and degreased in conventional manner, using ethylene dichloride degreaser. A post-emulsifiable penetrant was then employed, having an $I_e$ value of about 10, and being of the following formulation:

| | |
|---|---|
| Dimethylnaphthalene | gal__ 300 |
| Polyoxyethylated nonylphenol (1.5 mols ethylene oxide) | gal__ 110 |
| Dioctyl Phthalate | gal__ 165 |
| Fluoranthrene | lbs__ 900 |
| Dye—C.I. Fluorescent Brightening Agent 75 | lbs__ 36 |

The above penetrant liquid was applied to the skin component, by dipping in a tank of the penetrant. A dwell time of 10 minutes was employed. The excess penetrant was then allowed to drain off from the skin component.

The skin component was then treated with a standard emulsifier meeting the U.S. Air Force Specification MIL-I-25135C(ASG). The emulsifier was applied by a conventional dip process. The dwell time here was 2 minutes, during which time the excess emulsifier was allowed to drain off from the skin component.

The skin component was then washed in water by a high pressure spray. The washing step here was carried out under continuous black light inspection. Excess water was then removed from the skin component by means of an air hose.

The skin component was then inspected under black light and was found to reveal numerous brilliantly fluorescent pin-points of light, representing the porous structure and cracks in the disilicide surface film.

The following examples disclose penetrant flaw tracer liquids in accordance with the invention, all of which liquids may be employed in the penetrant inspection process of Example 2, or in other suitable penetrant inspections processes.

*Example No. 3.*—The following conventional penetrant formulation was evaluated by the standard $I_e$ method and found to have an $I_e$ value in excess of 100:

| | Parts |
|---|---|
| Diethylene glycol monobutyl ether | 16 |
| Base oil—100 pale | 64 |
| Visible red dye | 4 |

To the above formulation was added 16 parts of dioctyl phthalate. The final $I_e$ value was, upon testing, then found to be about 45.

*Example No. 4.*—The following conventional penetrant formulation was found to have an $I_e$ value in excess of 100:

| | Parts |
|---|---|
| Fluorescent dye | 2 |
| Base oil—100 pale | 96 |

To the above formulation was added two parts of polyoxyethylated nonylphenol (1.5 mols ethylene oxide). Upon testing, the $I_e$ value was then found to have been reduced to below 40.

*Example No. 5.*—The following conventional penetrant formulation was found to exhibit an $I_e$ value in excess of 100:

| | Parts |
|---|---|
| Butyl alcohol | 10 |
| Fluorescent dye | 2 |
| Base oil—100 pale | 68 |

To the above formulation was added 20 parts of nonylphenol. Upon testing, the $I_e$ value was found to have been reduced to about 10.

*Example No. 6.*—The following conventional penetrant formulation was found to exhibit an $I_e$ value in excess of 100:

| | Parts |
|---|---|
| Butyl alcohol | 15 |
| Visible red dye | 5 |
| 1,2-polyoxypropylene aliphatic monoether ("Ucon LB-65") | 55 |

To the above formulation was added 25 parts of dimethyl naphthalene. Such addition was found, upon testing of the liquid, to have reduced the $I_e$ value to about 30.

*Example No. 7.*—The following conventional penetrant formulation was found to have an $I_e$ value in excess of 100:

| | Parts |
|---|---|
| Butyl alcohol | 15 |
| Fluorescent dye | 2 |
| Kerosene | 58 |

To the above formulation was added 25 parts of didecyl adipate. The $I_e$ value, as a result, was reduced to about 45.

*Example No. 8.*—The following penetrant formulation, utilizing a water miscible solvent carrier, was found to have an $I_e$ value in excess of 100.

| | Parts |
|---|---|
| N-methyl pyrrolidone | 55 |
| Fluorescent dye | 5 |

To the above formulation was added 40 parts of nonylphenol. The resultant mixture was found to have an $I_e$ value of about 10.

The following examples disclose penetrant formulations having low $I_e$ values, and having been originally prepared using the solvent liquids of the specified class of the invention, either alone or in combination with each other, and in some instances, in combination with conventional solvents.

*Example No. 9.*—The following penetrant formulation has an $I_e$ value of about 25:

| | Parts |
|---|---|
| Dimethyl naphthalene | 98 |
| Visible red dye | 2 |

*Example No. 10.*—The following penetrant formulation has an $I_e$ value of about 10:

| | Parts |
|---|---|
| Dimethyl naphthalene | 60 |
| Polyoxyethylated nonylphenol | 18 |
| (1.5 mols ethylene oxide) | |
| Visible red dye | 22 |

*Example No. 11.*—The following penetrant formulation has an $I_e$ value of about 10:

| | Parts |
|---|---|
| Dimethyl naphthalene | 12 |
| (Commercial mixture of Isomers) | |
| Octyl phenol | 16 |
| Di(2-ethylhexyl) phthalate | 51 |
| Fluorescent dye | 1 |

*Example No. 12.*—The following penetrant formulation has an $I_e$ value of about 3.5:

| | Parts |
|---|---|
| Polyoxyethylated dodecyl phenol (2.5 mols ethylene oxide) | 98 |
| Fluorescent dye | 2 |

*Example No. 13.*—The following penetrant formulation has an $I_e$ value of about 25:

| | Parts |
|---|---|
| Dioctyl phthalate [di(2-ethylhexyl) phthalate] | 98 |
| Fluorescent dye | 2 |

*Example No. 14.*—The following penetrant formulation has an $I_e$ value of about 30:

| | Parts |
|---|---|
| Polypropylene glycol di(2-ethylhexoate) | 95 |
| Fluorescent dye | 5 |

*Example No. 15.*—The following penetrant formulation has an $I_e$ value of about 45:

| | Parts |
|---|---|
| Polyethylene glycol di(2-ethylhexoate) | 92 |
| Visible red dye | 8 |

*Example No. 16.*—The following penetrant formulation has an $I_e$ value of about 45:

| | Parts |
|---|---|
| Didecyl adipate | 96 |
| Fluorescent dye | 4 |

*Example No. 17.*—The following penetrant formulation has an $I_e$ value of about 45:

| | Parts |
|---|---|
| Didecyl sebacate | 95 |
| Visible red dye | 5 |

*Example No. 18.*—The following penetrant formulation has an $I_e$ value of about 1.75:

| | Parts |
|---|---|
| Nonyl phenol | 98 |
| Fluorescent dye | 2 |

Under certain requirements, penetrant formulations prepared in accordance with the invention to have an $I_e$ value below 50, and including one or more solvents of the specified class of the invention, may themselves be adjusted for alteration of their respective $I_e$ values.

*Example No. 19.*—The following penetrant formulation has an $I_e$ value of about 20:

| | Parts |
|---|---|
| Dimethyl naphthalene (mixed isomers) | 70 |
| Visible red dye | 5 |

To the above formulation was added 25 parts of polyoxyethylated nonylphenol (1.5 mols ethylene oxide). As a result, the $I_e$ value was reduced to about 10.

*Example No. 20.*—The following penetrant formulation has an $I_e$ value of about 25:

| | Parts |
|---|---|
| Dimethyl naphthalene | 45 |
| Dioctyl phthalate | 40 |
| Fluorescent dye | 5 |

For a particular usage requirement, an $I_e$ value of about 40 was required. This was achieved by the addition to the above formulation of 10 parts of ethylene glycol monobutyl ether.

*Example No. 21.*—The following penetrant formulation has an $I_e$ value of about 30:

| | Parts |
|---|---|
| Polyoxyethylated nonylphenol | 90 |
| Fluorescent dye | 8 |

To the above formulation was added 2 parts of dodecyl phenol. As a result, the $I_e$ value was adjusted to a desired value of about 25.

Although the invention has been described with reference to particular embodiments thereof, it will be understood that various changes and modifications may be made therein, without departing from the spirit of the invention or the scope of the appended claims.

I claim:

1. An inspection penetrant liquid for detecting surface-connected defects, said penetrant liquid consisting essentially of a solvent and at least one dye dissolved in said solvent, said solvent consisting of at least one member selected from the group consisting of (a) a normally liquid solvent of the generic formula

in which R is naphthalene and each of $x$ and $y$ is an alkyl radical containing from 1 to 3 carbon atoms, (b) a normally liquid solvent of the generic formula

in which R is phthalate (or isophthalate) and each of $x$ and $y$ is an alkyl radical containing from 6 to 10 carbon atoms, (c) a normally liquid solvent of the generic formula

in which R is saturated dicarboxylate, where the number $n$ of the $CH_2$ radicals in the dicarboxylate nucleus is in the approximate range of 0–34, and each of $x$ and $y$ is an alkyl radical containing from 6 to 10 carbon atoms, (d) a normally liquid solvent of the generic formula

in which R is phenol and each of $x$ and $y$ is an alkyl radical containing from 8 to 12 carbon atoms,
(e) a normally liquid solvent of the generic formula

in which R is phenol, $x$ is an alkyl radical containing from 8 to 12 carbon atoms, and $y$ is an ethoxy group containing from zero to 5 mols of ethylene oxide per mol of R, and
(f) a normally liquid solvent of the generic formula

in which R is 4.5-epoxy-tetrahydrophthalate and each of $x$ and $y$ is an alkyl radical containing from 6 to 8 carbon atoms,
said solvent being present in said inspection penetrant liquid in a weight concentration within the approximate range of 2 to 98 percent.

2. An inspection penetrant liquid for detecting surface-connected defects, said penetrant liquid consisting essentially of a solvent and at least one fluorescent dye dissolved in said solvent, said solvent consisting of at least one member selected from the group consisting of
(a) a normally liquid solvent of the generic formula

in which R is naphthalene and each of $x$ and $y$ is an alkyl radical containing from 1 to 3 carbon atoms,
(b) a normally liquid solvent of the generic formula

in which R is phthalate (or isophthalate) and each of $x$ and $y$ is an alkyl radical containing from 6 to 10 carbon atoms,
(c) a normally liquid solvent of the generic formula

in which R is saturated dicarboxylate, where the number $n$ of the $CH_2$ radicals in the dicarboxylate nucleus is in the approximate range of 0–34, and each of $x$ and $y$ is an alkyl radical containing from 6 to 10 carbon atoms,
(d) a normally liquid solvent of the generic formula

in which R is phenol and each of $x$ and $y$ is an alkyl radical containing from 8 to 12 carbon atoms,
(e) a normally liquid solvent of the generic formula

in which R is phenol, $x$ is an alkyl radical containing from 8 to 12 carbon atoms, and $y$ is an ethoxy group containing from zero to 5 mols of ethylene oxide per mole of R, and
(f) a normally liquid solvent of the generic formula

in which R is 4.5-epoxy-tetrahydrophthalate and each of $x$ and $y$ is an alkyl radical containing from 6 to 8 carbon atoms,
said solvent being present in said inspection penetrant liquid in a weight concentration within the approximate range of 2 to 98 percent.

3. An inspection penetrant liquid for detecting surface-connected defects, said penetrant liquid consisting essentially of a solvent and at least one visible-color dye dissolved in said solvent, said solvent consisting of at least one member selected from the group consisting of
(a) a normally liquid solvent of the generic formula

in which R is naphthalene and each of $x$ and $y$ is an alkyl radical containing from 1 to 3 carbon atoms,
(b) a normally liquid solvent of the generic formula

in which R is phthalate (or isophthalate) and each of $x$ and $y$ is an alkyl radical containing from 6 to 10 carbon atoms,
(c) a normally liquid solvent of the generic formula

in which R is saturated dicarboxylate, where the number of $n$ of the $CH_2$ radicals in the dicarboxylate nucleus is in the approximate range of 0–34, and each of $x$ and $y$ is an alkyl radical containing from 6 to 10 carbon atoms,
(d) a normally liquid solvent of the generic formula

in which R is phenol and each of $x$ and $y$ is an alkyl radical containing from 8 to 12 carbon atoms,
(e) a normally liquid solvent of the generic formula

in which R is phenol, $x$ is an alkyl radical containing from 8 to 12 carbon atoms, and $y$ is an ethoxy group containing from zero to 5 mols of ethylene oxide per mol of R, and
(f) a normally liquid solvent of the generic formula

in which R is 4.5-epoxy-tetrahydrophthalate and each of $x$ and $y$ is an alkyl radical containing from 6 to 8 carbon atoms,
said solvent being present in said inspection penetrant liquid in a weight concentration within the approximate range of 2 to 98 percent.

4. In the nondestructive testing of test bodies for surface discontinuities, the step of applying over the surface of a test body a penetrant flaw tracer liquid, said liquid consisting essentially of a water-insoluble carrier and at least one dye dissolved in said carrier, said carrier consisting essentially of at least one member selected from the group consisting of
(a) a normally liquid solvent of the generic formula

in which R is naphthalene and each of $x$ and $y$ is an alkyl radical containing from 1 to 3 carbon atoms,
(b) a normally liquid solvent of the generic formula

in which R is phthalate (or isophthalate) and each of $x$ and $y$ is an alkyl radical containing from 6 to 10 carbon atoms,
(c) a normally liquid solvent of the generic formula

in which R is saturated dicarboxylate, where the number $n$ of the $CH_2$ radicals in the dicarboxylate nucleus is in the approximate range of 0–34, and each of $x$ and $y$ is an alkyl radical containing from 6 to 10 carbon atoms, (d) a normally liquid solvent of the generic formula

in which R is phenol and each of $x$ and $y$ is an alkyl radical containing from 8 to 12 carbon atoms, (e) a normally liquid solvent of the generic formula

in which R is phenol, $x$ is an alkyl radical containing from 8 to 12 carbon atoms, and $y$ is an ethoxy group containing from zero to 5 mols of ethylene oxide per mol of R, and (f) a normally liquid solvent of the generic formula

in which R is 4.5-epoxy-tetrahydrophthalate and each of $x$ and $y$ is an alkyl radical containing from 6 to 8 carbon atoms,
said carrier being present in said flaw tracer liquid in a weight concentration within the approximate range of 2 to 98 percent.

5. In the nondestructive testing of test bodies for surface discontinuities, the step of applying over the surface of a test body a penetrant flaw tracer liquid, said liquid consisting essentially of a water-insoluble carrier and at least one fluorescent dye dissolved in said carrier, said carrier consisting essentially of at least one member selected from the group consisting of (a) a normally liquid solvent of the generic formula

in which R is naphthalene and each of $x$ and $y$ is an alkyl radical containing from 1 to 3 carbon atoms, (b) a normally liquid solvent of the generic formula

in which R is phthalate (or isophthalate) and each of $x$ and $y$ is an alkyl radical containing from 6 to 10 carbon atoms, (c) a normally liquid solvent of the generic formula

in which R is saturated dicarboxylate, where the number $n$ of the $CH_2$ radicals in the dicarboxylate nucleus is in the approximate range of 0–34, and each of $x$ and $y$ is an alkyl radical containing from 6 to 10 carbon atoms, (d) a normally liquid solvent of the generic formula

in which R is phenol and each of $x$ and $y$ is an alkyl radical containing from 8 to 12 carbon atoms, (e) a normally liquid solvent of the generic formula

in which R is phenol, $x$ is an alkyl radical containing from 8 to 12 carbon atoms, and $y$ is an ethoxy group containing from zero to 5 mols of ethylene oxide per mol of R, and (f) a normally liquid solvent of the generic formula

in which R is 4.5-epoxy-tetrahydrophthalate and each of $x$ and $y$ is an alkyl radical containing from 6 to 8 carbon atoms,
said carrier being present in said flaw tracer liquid in a weight concentration within the approximate range of 2 to 98 percent.

6. In the nondestructive testing of test bodies for surface discontinuities, the step of applying over the surface of a test body a penetrant flaw tracer liquid, said liquid consisting essentially of a water-insoluble carrier and at least one visible-color dye dissolved in said carrier, said carrier consisting essentially of at least one member selected from the group consisting of (a) a normally liquid solvent of the generic formula

in which R is naphthalene and each of $x$ and $y$ is an alkyl radical containing from 1 to 3 carbon atoms, (b) a normally liquid solvent of the generic formula

in which R is phthalate (or isophthalate) and each of $x$ and $y$ is an alkyl radical containing from 6 to 10 carbon atoms, (c) a normally liquid solvent of the generic formula

in which R is saturated dicarboxylate, where the number $n$ of the $CH_2$ radicals in the dicarboxylate nucleus is in the approximate range of 0–34, and each of $x$ and $y$ is an alkyl radical containing from 6 to 10 carbon atoms, (d) a normally liquid solvent of the generic formula

in which R is phenol and each of $x$ and $y$ is an alkyl radical containing from 8 to 12 carbon atoms, (e) a normally liquid solvent of the generic formula

in which R is phenol, $x$ is an alkyl radical containing from 8 to 12 carbon atoms, and $y$ is an ethoxy group containing from zero to 5 mols of ethylene oxide per mol of R, and (f) a normally liquid solvent of the generic formula

in which R is 4.5-epoxy-tetrahydrophthalate and each of $x$ and $y$ is an alkyl radical containing from 6 to 8 carbon atoms,
said carrier being present in said flaw tracer liquid in a weight concentration within the approximate range of 2 to 98 percent.

7. In the nondestructive testing of test bodies for surface discontinuities, the step of applying over the surface of a test body a penetrant flaw tracer liquid, said liquid consisting essentially of a water-insoluble carrier and at least one dye dissolved in said carrier, said carrier consisting essentially of mixed isomers of dimethyl naphthalene, said mixed isomers of dimethyl naphthalene being present in said flaw tracer liquid in a weight concentration within the approximate range of 2 to 98 percent.

8. An inspection penetrant liquid for detecting surface-connected defects, said penetrant liquid consisting essentially of a solvent and at least one dye dissolved in said solvent, said solvent consisting of at least one member selected from the group consisting of dimethyl naphthalene, diethyl naphthalene, and dipropyl naphthalene, said solvent being present in said inspection penetrant liquid in a weight concentration within the approximate range of 2 to 98 percent.

9. An inspection penetrant liquid for detecting surface-connected defects, said penetrant liquid consisting essentially of a solvent and at least one dye dissolved in said solvent, said solvent consisting of at least one member selected from the group consisting of dioctyl phthalate, di(2-ethyl-butyl) phthalate, ethylhexyl decyl phthalate, and didecyl phthalate, said solvent being present in said inspection penetrant liquid in a weight concentration within the approximate range of 2 to 98 percent.

10. An inspection penetrant liquid for detecting surface-connected defects, said penetrant liquid consisting essentially of a solvent and at least one dye dissolved in said solvent, said solvent consisting of at least one member selected from the group consisting of triethylene glycol di(2-ethyl-butyrate), triethylene glycol di(2-ethylhexoate), polyethylene glycol di(2-ethylhexoate), ethylene glycol di(2-ethyl-butyrate), polyethylene glycol di(2-ethyl-butyrate), propylene glycol di(2-ethyl-butyrate), and polypropylene glycol di(2-ethyl-hexoate), said solvent being present in said inspection penetrant liquid in a weight concentration within the approximate range of 2 to 98 percent.

11. An inspection penetrant liquid for detecting surface-connected defects, said penetrant liquid consisting essentially of a solvent and at least one dye dissolved in said solvent, said solvent consisting of at least one member selected from the group consisting of didecyl adipate, di(2-ethyl-butyl) sebacate, didecyl sebacate, didecyl oxalate, di(2-ethylhexyl) adipate, di(2-ethylamyl) undecane-dicarboxylate, di(2-ethyl-heptyl) glutarate, and dinonyl malonate, said solvent being present in said inspection penetrant liquid in a weight concentration within the approximate range of 2 to 98 percent.

12. An inspection penetrant liquid for detecting surface-connected defects, said penetrant liquid consisting essentially of a solvent and at least one dye dissolved in said solvent, said solvent consisting of at least one member selected from the group consisting of di(2-ethylhexyl) phenol (dioctyl phenol), dinonyl phenol, didecyl phenol, di(undecyl) phenol, di(dodecyl) phenol, octyl phenol, nonyl phenol, decyl phenol, undecyl phenol, and dodecyl phenol, said solvent being present in said inspection penetrant liquid in a weight concentration within the approximate range of 2 to 98 percent.

13. An inspection penetrant liquid for detecting surface-connected defects, said penetrant liquid consisting essentially of a solvent and at least one dye dissolved in said solvent, said solvent consisting of at least one member selected from the group consisting of polyoxyethylated octyl phenol (1 to 5 mols ethylene oxide), polyoxyethylated nonylphenol (1 to 5 mols ethylene oxide), polyoxyethylated decylphenol (1 to 5 mols ethylene oxide), polyoxyethylated undecylphenol (1 to 5 mols ethylene oxide), and polyoxyethylated dodecylphenol (1 to 5 mols ethylene oxide), said solvent being present in said inspection penetrant liquid in a weight concentration within the approximate range of 2 to 98 percent.

14. An inspection penetrant liquid for detecting surface-connected defects, said penetrant liquid consisting essentially of a solvent and at least one dye dissolved in said solvent, said solvent consisting of at least one member elected from the group consisting of di(2-ethyl-hexyl) - 4.5-epoxy-tetrahydrophthalate, di(2-ethylbutyl)- 4.5-epoxy-tetrahydrophthalate, and di(2-ethylamyl)-4.5-epoxy-tetrahydrophthalate, said solvent being present in said inspection penetrant liquid in a weight concentration within the approximate range of 2 to 98 percent.

15. In the nondestructive testing of test bodies for surface discontinuities, the step of applying over the surface of a test body a penetrant flaw tracer liquid, said liquid consisting essentially of a water-insoluble carrier and at least one dye dissolved in said carrier, said carrier consisting essentially of at least one member selected from the group consisting of dimethyl naphthalene, diethyl naphthalene, and dipropyl naphthalene, said carrier being present in said inspection penetrant liquid in a weight concentration within the approximate range of 2 to 98 percent.

16. In the nondestructive testing of test bodies for surface discontinuities, the step of applying over the surface of a test body of penetrant flaw tracer liquid, said liquid consisting essentially of a water-insoluble carrier and at least one dye dissolved in said carrier, said carrier consisting essentially of at least one member selected from the group consisting of dioctyl phthalate, di(2-ethyl-butyl) phthalate, ethylhexyl decyl phthalate, and didecyl phthalate, said carrier being present in said inspection penetrant liquid in a weight concentration within the approximate range of 2 to 98 percent.

17. In the nondestructive testing of test bodies for surface discontinuities, the step of applying over the surface of a test body a penetrant flaw tracer liquid, said liquid consisting essentially of a water-insoluble carrier and at least one dye dissolved in said carrier, said carrier consisting essentially of at least one member selected from the group consisting of triethylene glycol di(2-ethyl-butyrate), triethylene glycol di(2-ethylhexoate), polyethylene glycol di(2-ethylhexoate), ethylene glycol di(2-ethyl-butyrate), polyethylene glycol di(2-ethyl-butyrate), propylene glycol di(2-ethyl-butyrate), and polypropylene glycol di(2-ethyl-hexoate), said carrier being present in said inspection penetrant liquid in a weight concentration within the approximate range of 2 to 98 percent.

18. In the nondestructive testing of test bodies for surface discontinuities, the step of applying over the surface of a test body a penetrant flaw tracer liquid, said liquid consisting essentially of a water-insoluble carrier and at least one dye dissolved in said carrier, said carrier consisting essentially of at least one member selected from the group consisting of didecyl adipate, di(2-ethyl-butyl) sebacate, didecyl sebacate, didecyl oxalate, di(2-ethylhexyl) adipate, di(2-ethylamyl) undecane - dicarboxylate, di(2 - ethyl - heptyl) glutarate, and dinonyl malonate, said carrier being present in said inspection penetrant liquid in a weight concentration within the approximate range of 2 to 98 percent.

19. In the nondestructive testing of test bodies for surface discontinuities, the step of applying over the surface of a test body, a penetrant flaw tracer liquid, said liquid consisting essentially of a water-insoluble carrier and at least one dye dissolved in said carrier, said carrier consisting essentially of at least one member selected from the group consisting of di(2-ethylhexyl) phenol (dioctyl phenol), dinonyl phenol, didecyl phenol, di(undecyl) phenol, di(dodecyl) phenol, octyl phenol, nonyl phenol, decyl phenol, undecyl phenol, and dodecyl phenol, said carrier being present in said inspection penetrant liquid in a weight concentration within the approximate range of 2 to 98 percent.

20. In the nondestructive testing of test bodies for surface discontinuities, the step of applying over the surface of a test body, a penetrant flaw tracer liquid, said liquid consisting essentially of a water-insoluble carrier and at least one dye dissolved in said carrier, said carrier consisting essentially of at least one member selected from the group consisting of polyoxyethylated octyl phenol (1 to 5 mols ethylene oxide), polyoxyethylated nonylphenol (1 to 5 mols ethylene oxide), polyoxyethylated decylphenol (1 to 5 mols ethylene oxide), polyoxyethylated undecylphenol (1 to 5 mols ethylene oxide), and polyoxyethylated dodecylphenol (1 to 5 mols ethylene oxide), said carrier being present in said inspection penetrant liquid in a weight concentration within the approximate range of 2 to 98 percent.

21. In the nondestructive testing of test bodies for surface discontinuities, the step of applying over the surface of a test body of penetrant flaw tracer liquid, said liquid consisting essentially of a water-insoluble carrier and at least one dye dissolved in said carrier, said carrier consisting essentially of at least one member selected from the group consisting of di(2-ethylhexyl)-4.5-epoxy-tetrahydrophthalate, di(2 - ethylbutyl) - 4.5-epoxy-tetrahydrophthalate, and di(2 - ethylamyl) - 4.5 - epoxy-tetrahydrophthalate, said carrier being present in said inspection penetrant liquid in a weight concentration within the approximate range of 2 to 98 percent.

References Cited by the Examiner

UNITED STATES PATENTS

| | | | |
|---|---|---|---|
| 2,681,317 | 6/1954 | Grossman | 106—22 XR |
| 2,764,556 | 9/1956 | Sockman et al. | 252—408 |
| 2,871,697 | 2/1959 | Sockman | 252—408 XR |
| 2,920,203 | 1/1960 | Switzer et al. | 252—408 XR |
| 2,953,530 | 9/1960 | Switzer | 252—408 XR |
| 2,963,490 | 12/1960 | Rowland et al. | 252—348 |
| 3,028,338 | 4/1962 | Parker | 252—408 XR |
| 3,068,178 | 12/1962 | Kallmann et al. | 252—408 XR |

OTHER REFERENCES

The Condensed Chemical Dictionary, Sixth Edition, Reinhold Publishing Corporation, New York, 1961, page 626 relied on.

ALEXANDER H. BRODMERKEL, *Primary Examiner.*

SAMUEL H. BLECH, J. B. EVANS, *Assistant Examiners.*